United States Patent [19]

Priester, Jr. et al.

[11] Patent Number: 4,845,133

[45] Date of Patent: Jul. 4, 1989

[54] FLEXIBLE POLYUREA OR POLYUREA-POLYURETHANE FOAMS PREPARED FROM HIGH EQUIVALENT WEIGHT AMINE-TERMINATED COMPOUNDS

[75] Inventors: Ralph D. Priester, Jr.; Richard D. Peffley, both of Lake Jackson; Ronald M. Herrington, Brazoria, all of Tex.

[73] Assignee: The Dow Chemical Company, Midland, Mich.

[21] Appl. No.: 170,971

[22] Filed: Mar. 21, 1988

Related U.S. Application Data

[63] Continuation-in-part of Ser. No. 35,681, Apr. 7, 1987, abandoned.

[51] Int. Cl.[4] .................... C08G 18/14; C08G 18/48; C08G 18/32

[52] U.S. Cl. .................................... 521/167; 521/116; 521/163; 252/182.22; 252/182.23; 252/182.24

[58] Field of Search ............... 521/167, 126, 125, 160, 521/163; 252/182.27, 182.23, 182.24

[56] References Cited

U.S. PATENT DOCUMENTS

| | | | |
|---|---|---|---|
| 3,838,076 | 9/1974 | Moss et al. | 521/164 |
| 4,386,218 | 5/1983 | Rasshofer et al. . | |
| 4,442,236 | 5/1984 | Rasshofer et al. | 521/130 |
| 4,444,910 | 4/1984 | Rice et al. | 521/160 |
| 4,456,730 | 6/1984 | Balle et al. . | |
| 4,472,568 | 5/1984 | Rasshofer et al. . | |
| 4,474,901 | 10/1984 | Dominguez | 528/76 |
| 4,501,873 | 2/1985 | Rasshofer . | |
| 4,506,039 | 3/1985 | Balle et al. . | |
| 4,515,923 | 5/1985 | Fauss et al. . | |
| 4,525,534 | 6/1985 | Rasshofer . | |
| 4,525,590 | 6/1985 | Rasshofer et al. . | |
| 4,530,941 | 7/1985 | Turner et al. | 528/76 |
| 4,532,266 | 7/1985 | Rasshofer et al. . | |
| 4,532,317 | 7/1985 | Rasshofer . | |
| 4,540,720 | 9/1985 | Rasshofer et al. . | |
| 4,555,531 | 11/1985 | Christman | 521/167 |
| 4,565,645 | 1/1986 | Rasshofer et al. . | |
| 4,569,951 | 2/1986 | Nelson | 528/79 |
| 4,569,952 | 2/1986 | Radovich et al. | 521/167 |
| 4,578,500 | 3/1986 | Rasshofer et al. . | |
| 4,609,685 | 8/1986 | Cuscurida et al. | 521/167 |
| 4,642,320 | 2/1987 | Turner et al. | 521/176 |

FOREIGN PATENT DOCUMENTS

| | | | |
|---|---|---|---|
| 81701 | 6/1983 | European Pat. Off. . | |
| A181701 | 6/1983 | European Pat. Off. . | |
| 217247 | 4/1987 | European Pat. Off. . | |
| 219035 | 4/1987 | European Pat. Off. . | |
| 152014 | 9/1983 | Japan | 521/160 |

*Primary Examiner*—John Kight
*Assistant Examiner*—Dennis R. Daley

[57] ABSTRACT

Flexible polyurethane foams are prepared by reacting a polyisocyanate with certain amine-terminated compounds. The amine terminated compounds are characterized in having at least 30 percent of their active hydrogen-containing groups in the form of primary aromatic, Lewis acid-blocked primary aliphatic and/or secondary aromatic or aliphatic amine groups. The resulting foams exhibit excellent physical properties, even in the absence of a cross-linker compound.

33 Claims, No Drawings

FLEXIBLE POLYUREA OR POLYUREA-POLYURETHANE FOAMS PREPARED FROM HIGH EQUIVALENT WEIGHT AMINE-TERMINATED COMPOUNDS

CROSS-REFERENCE TO RELATED APPLICATION

This application is a continuation-in-part of application Ser. No. 035,681, filed Apr. 7, 1987 now abandoned.

BACKGROUND OF THE INVENTION

This invention relates to flexible foams prepared in the reaction of a polyisocyanate and a high equivalent weight compound having a plurality of active hydrogen-containing groups.

Flexible polyurethane foams have been in commercial use for many years. Their most common uses are in cushioning, as in furniture and automobiles, bedding, carpet underlayment, and other padding or cushioning applications.

Flexible polyurethane foams have been conventionally prepared by reacting components comprising a high equivalent weight polyol, a polyisocyanate and a blowing agent. Several methods of reacting these have been used. In one method, the high equivalent weight polyol is reacted with a stoichiometric excess of the polyisocyanate to form a prepolymer which is then reacted with water and optionally other polyols and blowing agents to form the foam. In another method, the polyol is mixed with the blowing agent and all the other components except the polyisocyanate to form a "B-side" composition which is then reacted with the polyisocyanate to form the foam.

In recent years it has become desirable to form higher load-bearing foam, particularly for seating materials. Several approaches to producing higher load-bearing foams have been used. One approach involves the use of cross-linkers, i.e., low equivalent weight highly reactive polyols or polyamines. Using this method, higher load-bearing foams can be prepared. Unfortunately, the use of the cross-linkers tend to upset the balance between the so-called blowing and gelling reactions which occur as the foam is produced. In order to get an open-celled foam having good physical properties, it is necessary that the reaction of the polyol with the isocyanate and the generation of gases by the blowing agent be properly sequenced. If the foam gels too quickly the foam will shrink after cooling. If the foam gels too slowly, large, uneven cells are formed, or worse, the gases produced by the blowing agent escape altogether, producing an "air bag". For this reason, the use of cross-linkers has proved difficult in commercial practice. In addition, the cross-linkers add significantly to the cost of the foam, as not only is the cost of the cross-linker added, but additional polyisocyanate must be used to compensate for the presence of the cross-linker. Accordingly, it would be desirable to use a minimal level of cross-linker in preparing flexible foams.

Another approach is to use microdispersions of polymeric filler materials. These so-called "polymer polyols" and "polymer isocyanates" provide reinforcement through the presence of colloidally sized polymer particles which are dispersed in either or both of the polyol and the polyisocyanate. A wide variety of polymer particles have been dispersed in polyols and polyisocyanates in this manner, including vinyl polymers such as styrene-acrylonitrile (SAN) copolymers, polyisocyanate polyaddition (PIPA) polymers, polyurea particles, and more recently, epoxy particles.

Several problems remain with the use of these polymer dispersions. Although they do provide improved load-bearing, as well as aiding in cell opening, it is desirable in some cases to increase the load-bearing even further. In addition, they are somewhat more difficult to handle, transport and process due to a tendency of the dispersed particles to agglomerate and settle out of the continuous phase. The polymer polyols and polymer isocyanates are expensive relative to the polyols and polyisocyanates themselves. Moreover, even with the use of these dispersions, it is usually required to use a cross-linker as well, further adding to the cost of the foam. Additionally, the problem of shrinkage of molded foams made from polymer dispersions in applications in which crushing is impossible is a further disadvantage.

A further consideration is the preparation of low density foams by the use of increasing amounts of water in the foam formulation. Foams are conventionally prepared using from about 2–4 parts of water per 100 parts by weight polyol to provide a cellular structure. Recently, lower density foams using up to 4.6 parts water have been made. Until now, these high water foams have been difficult to make and process. The water has tended to react much more quickly than the polyol, causing premature blowing and collapse of the foam.

It would be desirable to provide a flexible foam which has good load-bearing, in which the use of cross-linkers and polymer dispersions can be minimized or even eliminated, and which can, if desired, be prepared at a low density using high amounts of water in the formulation.

SUMMARY OF THE INVENTION

In one aspect, this invention is an open-celled flexible polyurea or polyurea-polyurethane foam having a density of about 6 pounds per cubic foot or less, which is the reaction product of a reaction mixture comprising (A) a relatively high equivalent weight compound or mixture thereof having an average of about 1.5 to about 4 active hydrogen-containing groups per molecule, of which active hydrogen-containing groups at least about 30 percent are primary aromatic, Lewis acid-blocked primary aliphatic and/or secondary aliphatic or aromatic amine groups, (B) a blowing agent, in amount sufficient to provide a cellular structure to the foam, (C) less than 5 parts by weight of a cross-linker or chain extender per 100 parts of component (a), and (D) a polyisocyanate.

In another aspect, this invention is a process for preparing a polyurethane foam, comprising reacting a reaction mixture as described herein in a one-step process under conditions such that a flexible polyurea or polyurea-polyurethane foam is obtained.

In yet another aspect, this invention is a improvement in a process for preparing an open-celled flexible polymer foam by reacting components comprising a relatively high equivalent weight compound having a plurality of active hydrogen-containing groups, less than 5 parts by weight of a cross-linker or chain extender per 100 parts of component (a), and a polyisocyanate in the presence of a sufficient amount of a blowing agent to provide the foam with a density of about six pounds per cubic foot or less, the improvement comprising using as the relatively high equivalent weight compound a relatively high equivalent weight compound or mixture thereof having from about 1.5 to about 4 active hydrogen-containing groups per molecule, of which groups at least about 30 percent are primary aromatic, Lewis acid-blocked primary aliphatic and/or secondary aromatic or aliphatic amine groups.

In still another aspect, this invention is an active hydrogen-containing composition comprising (A) a relatively high equivalent weight compound or mixture thereof having an average of about 1.5 to about 4 active hydrogen-containing groups per molecule, of which active hydrogen-containing groups, at least about 30 percent are primary aromatic, Lewis acid-blocked primary aliphatic and/or secondary aliphatic or aromatic amine groups, (B) about 3.5 to about 10 parts by weight of water per 100 parts by weight of component (A), and (C) from about 0.1 to about 4.5 parts by weight of a cross-linker or chain extender per 100 parts by weight component (a).

The use of a relatively high equivalent weight compound containing at least 30 percent primary aromatic, Lewis acid-blocked primary aliphatic and/or secondary aromatic or aliphatic amine groups (hereinafter "amine-terminated compound) has been found to provide several unexpected benefits. The foams have particularly good load-bearing properties, even in the absence of a cross-linker. When a cross-linker is used, the foam of this invention generally has better load-bearing than an otherwise similar foam which is prepared using only hydroxyl-terminated high equivalent weight compounds. The foam of this invention typically has load-bearing characteristics which approach or even exceed those of foams made from a polymer dispersion, at a similar level of cross-linker use. In addition, the foam of this invention is open-celled and often exhibits low shrinkage, which enables it to be used to make parts containing internal wires or other structures which prevent post foaming crushing. The foam formulation used in this invention further has excellent ability to flow and fill a complex mold. It has also been found that this invention in some instances permits the manufacture of foam using much higher amounts of water than was commercially possible using conventional processes.

DETAILED DESCRIPTION OF THE INVENTION

In this invention, an amine-terminated compound is used to prepare a flexible polyurea or polyurea-polyurethane foam. An amine-terminated compound, as that term is employed in this invention, means a relatively high equivalent weight compound or polymer, or mixture of such compounds or polymers, which has a plurality of active hydrogen-containing groups, of which at least about 30 percent are primary aromatic, Lewis acid-blocked primary aliphatic and/or secondary aliphatic or aromatic amine groups. The equivalent weight of the amine-terminated compound used herein depends somewhat on the particular type of foam being manufactured, but is advantageously about 400 to about 5000 and preferably about 500 to about 2500. The amine-terminated compound or mixture thereof has an average from about 1.5 to about 4, preferably about 1.8 to about 3, active hydrogen-containing groups per molecule.

The amine-terminated compound can be of any convenient structure as long as it contains no substituents which undesirably interfere with its ability to react with the polyisocyanate to form a polyurea or polyurea-polyurethane foam. Especially suitable amine-terminated compounds are polyethers or polyesters having a plurality of active hydrogen-containing groups of which at least about 30 percent are primary aromatic, Lewis acid-blocked primary aliphatic and/or secondary aliphatic or aromatic amine groups.

Suitable secondary aliphatic amine-terminated compounds include polyols, especially polyether and polyester polyols which have been modified to contain a proportion of secondary amine groups from about 30 to about 100 percent, preferably about 50 to about 100 percent, more preferably about 60 to 90 percent. Such secondary aliphatic amine-terminated compounds are conveniently prepared by reacting the corresponding polyol with a primary amine, and reducing the resulting intermediate with hydrogen, as described in U.S. Pat. No. 4,153,381. The primary amine is advantageously an inertly-substituted alkyl-, cycloalkyl- or benzylamine. Alternatively, secondary aliphatic amine-terminated compounds can be prepared in a Michael addition reaction of the corresponding primary aliphatic amine with an ethylenically unsaturated compound. Acrylonitrile is an especially suitable ethylenically unsaturated compound, although any compound which undergoes a Michael addition reaction with the primary amine to form a secondary amine, and which does not contain a substituent group which adversely interferes with the ability of the resultant product to react with a polyisocyanate, can be used. The primary aliphatic amine itself can be prepared in the reductive amination of the corresponding polyol with ammonia, as taught, for example, in U.S. Pat. Nos. 3,128,311; 3,152,998; 3,654,370; 3,347,926; and 4,014,933, incorporated by reference.

Suitable aromatic amine-terminated compounds include polyols, especially polyether and polyester polyols, which have been modified to contain a proportion of aromatic amine groups. Such compounds can be prepared, for example, by capping the corresponding polyether or polyester polyol with a diisocyanate to form a prepolymer, and then reacting the prepolymer with water to hydrolyze the free isocyanate groups to the corresponding primary amine. These types are less preferred due to their relatively high viscosity, which makes their processing more difficult. Alternatively, such compounds can be prepared by reacting the corresponding polyether or polyester polyol with a halogenated nitrobenzene compound such as o- or p-nitrochlorobenzene, or dinitrochlorobenzene, followed by the reduction of the nitro group(s) to the amine, as taught in copending application of Steuber et al., Ser. No. 923,255, filed Oct. 27, 1986 (now abandoned).

Preferably, the products are produced by the catalytic hydrogenation method. For typical methods see "Catalytic Hydrogenation over Platinum Metals" by Paul N. Rylander, 1967, Academic Press, New York, N.Y. Any of the catalysts known to be useful for the reduction of aromatic nitro groups can be employed inclusive of Raney nickel. A preferred group of catalysts is comprised of the platinum group metals which includes ruthenium, rhodium, palladium, osmium, iridium, and platinum. Preferably, the catalyst is supported on a carrier such as activated carbon, silica gel, alumina, diatomaceous earth, pumice, and the like. The exact proportions in which the elemental metal is present on the carrier is not a critical factor. Generally speaking, the metal can vary from about 0.05 to about 40 percent by weight, preferably from about 0.5 to 20, and, most preferably, from about 5 to about 10 percent by weight.

The proportions of catalyst employed expressed as the pure metal in respect of the nitro group to be reduced will advantageously fall within the range of from about 0.05 to about 10 mole percent of metal per equivalent of nitro group. Preferably, the range is about 0.1 to about 1.0 mole percent. The term "equivalent of nitro group" means the nitro equivalent weight which is obtained by dividing the molecular weight of the nitroaromatic compound (II) by the number of nitro groups per mole.

The hydrogenation is conducted in the liquid phase in the presence of the hydrogen and the catalyst component which, generally speaking, calls for the use of a solvent but the latter is not absolutely necessary. Any solvent known to be useful for catalytic hydrogenation methods but inert to the compounds (I) and (II) may be employed. Illustratively, the following solvents can be used solely or as mixtures thereof: aromatic hydrocarbons such as benzene, toluene, xylene and the like; alcohols such as methanol, ethanol, propanol, isopropanol, and the like; esters such as ethyl acetate, ethyl propionate, ethyl butyrate and the like; ethers such as dioxane, tetrahydrofuran and the like; and, water either alone or in combination with the above solvents. The use of liquid ammonia is also contemplated. The amount of solvent is not critical per se and any amount found to be efficacious can be employed. Advantageously, the nitroaromatic compound (II) is employed in at least 10 percent by weight in the solvent, preferably, from about 20 to about 70 percent by weight, and most preferably, about 25 to about 50 percent by weight.

The exact choice of temperature in any given hydrogenation is a function of the specific catalyst activity, hydrogen pressure, and the like. Advantageously, it can fall within a range of from about 0° C. to about 200° C., preferably from about 15° C. to about 100° C., most preferably about 20° C. to about 50° C.

Similarly, as with temperature noted above, the hydrogen pressure employed can cover any effective range such as from about 15 psig up to any reasonable working pressure. Generally speaking, the pressure will be from about 15 psig to about 200 psig, preferably from about 30 to about 60 psig.

Progression of the reduction is readily followed by monitoring the hydrogen uptake. Accordingly, the reduction is terminated at the point at which the theoretical quantity of hydrogen has been absorbed. Alternatively, the reduction is continued until no further hydrogen can be consumed.

In another suitable process, the corresponding hydroxyl- or primary amine-terminated polyether or polyester can be reacted with a material such as nitroanisole or a lower alkyl ester of p-aminobenzoic acid, particularly the methyl ester, followed by reduction of the nitro group, to generate an aromatic amine-terminated compound.

Secondary amine-terminated compounds can be prepared in a Michael reaction of the corresponding primary aromatic amine compound and an ethylenically unsaturated compound such as acrylonitrile as described before. Aromatic amine terminated compounds, either primary or secondary amine-terminated, advantageously contain a proportion of primary and/or secondary amine groups from about 30 to about 100, preferably about 50 to about 100, more preferably about 70 to about 100 percent of the total number of active hydrogen-containing groups supplied by the relatively high equivalent weight compound.

Blocked primary aliphatic amine compounds which are suitable herein are advantageously prepared in the reductive amination of the corresponding hydroxyl-terminated compound with ammonia, followed by the complexation thereof with a Lewis acid such as benzoyl chloride, carbon dioxide, a metal carboxylate such as a tin, zinc, titanium or aluminum carboxylate, and the like. The Lewis acid is advantageously used in amounts from about 0.2 to about 5, preferably about 0.9 to about 1.5, equivalents per equivalent of primary amine groups.

With any of the foregoing amine-terminated compounds, mixtures thereof with a polyol of suitable equivalent weight are also useful, as long as the proportion of amine groups is within the ranges indicted before, i.e., at least about 30 percent of the total amount of active hydrogen-containing groups contributed by the relatively high equivalent weight compounds. Of particular interest are mixtures of the amine-terminated compound with a polymer polyol such as a polyurea polyol dispersion (PHD polyol), a polyaddition polyisocyanate polyol dispersion (PIPA polyol), or an addition polymer dispersion such as a styrene-acrylonitrile copolymer polyol, containing up to about 50 percent by weight of the polymer polyol based on the weight of the relatively high equivalent weight materials employed.

As mentioned before, the preferred equivalent weight of the amine-terminated compound depends somewhat on the type of foam being made, and the method of its manufacture. For making a molded polyurethane foam in a hot cure process, the amine-terminated compound preferably has an equivalent weight from about 500 to about 2500, more preferably about 700–2000, and most preferably about 800–1500. For making slabstock foam or a molded polyurethane foam in a cold cure process, the most preferred equivalent weight is from about 500–1800.

Either aliphatic or aromatic polyisocyanates can be used in this invention to make foam. Suitable aliphatic polyisocyanates include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate, 1,5-diisocyanato-3,3,5-trimethylcyclohexane, 2,4- and/or 2,6-hexahydrotoluene diisocyanate, perhydro-2,4'- and/or -4,4'-diphenylmethanediisocyanate ($H_{12}MDI$), isophorone diisocyanate, and the like.

Suitable aromatic polyisocyanates include, for example, 2,4- and/or 2,6-toluene diisocyanate (TDI), 2,4'-diphenylmethanediisocyanate, 1,3- and 1,4-phenylene diisocyanate, 4,4'-diphenylmethane diisocyanate (including mixtures thereof with minor quantities of the 2,4'-isomer), 1,5-naphthylene diisocyanate, triphenylmethane-4,4',4''-triisocyanate, polyphenylpolymethylene polyisocyanates, and the like. When the polyisocyanate is MDI or a derivative of MDI, especially a mixture including a polymeric MDI, it is preferred that the amine-terminated compound be substantially difunctional, i.e., have an average functionality of about 1.5 to about 2.2, preferably about 1.8 to about 2.1, more preferably about 1.9 to about 2.05. It has been found that the use of substantially difunctional amine-terminated compounds, as opposed to the higher functionality polyols conventionally used in making flexible foam, delays the gelling of the reaction mixture and thereby further promotes the formation of good quality foam. Mixtures of a relatively high equivalent weight compound having an actual functionality of about 1.5 to about 1.95 and another relatively high equivalent weight compound having an actual functionality of about 2.2 or higher wherein the average functionality of the mixture is from about 1.5 to about 2.2 can be used.

In addition, derivatives and prepolymers of the foregoing polyisocyanates such as those containing urethane, carbodiimide, allophanate, isocyanurate, acylated urea, biuret, ester and similar groups are useful herein. Of these, prepolymers of TDI and MDI, and the so-called "liquid MDI" products which contain carbodiimide groups and have an equivalent weight of about 130–150 are of particular significance.

Of the foregoing polyisocyanates, TDI, MDI, isophorone diisocyanate, $H_{12}MDI$, hexamethylene diisocyanate, cyclohexane diisocyanate and derivatives thereof are preferred due to their cost, commercial availability and performance. TDI, MDI and derivatives of MDI are most preferred. TDI, particularly mixtures of the 2,4- and 2,6-isomers, is especially preferred.

The polyisocyanate is used in an amount sufficient to provide an isocyanate index of about 60–200, preferably about 90–125, more preferably about 95–110. At higher indices, trimerization of the polyisocyanate occurs, causing the foam to lose flexibility. At lower indices, insufficient curing occurs, causing the foam to have poor properties. When MDI or derivative thereof is used as the polyisocyanate, preferred isocyanate indices are from about 60–110, with 70–103 being most preferred, as MDI tends to provide a board-like foam at indices greater than about 110, but provides a highly resilient foam at indices as low as about 60. The "isocyanate index" is 100 times the ratio of isocyanate groups to active hydrogen-containing groups contained in the mixture which reacts to form the foam.

A blowing agent is another critical component of the invention. The blowing agent is any material which is capable of generating a gas under the conditions of the reaction of a polyisocyanate and a polyol. Such materials include air, carbon dioxide, nitrogen, water, formic acid, low-boiling halogenated alkanes, finely divided solids, the so-called "azo" blowing agents such as azobis(formamide) and the like. Preferred are water, the low-boiling halogenated alkanes, or mixtures thereof. Blowing agents are advantageously employed in a quantity sufficient to provide the foam with a bulk density from about 0.5, preferably about 0.9, more preferably about 1.1 to about to about 6 or less, preferably about 4, more preferably about 3 pounds per cubic foot. The halogenated alkanes, including methylene chloride, dichlorodifluoromethane, monochlorodifluoromethane, monochlorotrifluoromethane and the like, generally provide the desired density when employed in amounts from about 5 to about 50 parts per 100 parts relatively high equivalent weight compound. Lesser amounts are useful when employed in conjunction with another blowing agent, such as water.

One particular advantage of this invention is that it permits the production of very low density foam using water as the blowing agent. Previously, the use of water as the blowing agent was limited to about 4.6 parts or less per 100 parts relatively high equivalent weight polyol, since the use of greater quantities tended to provide inferior foam. With this invention, in excess of 7.5 parts of water can be used per 100 parts of amine-terminated compound to provide an ultra-low density foam having useful physical properties. Accordingly, water provides a desirable density when used in an amount from about 0.5, preferably about 3.5, more preferably about 4, to about 10, preferably about 8, more preferably 6, parts per 100 parts amine-terminated compound. For making ultra-low density foam (less than about 1.5 pounds per cubic foot density), about 5 to about 10 parts of water are used.

A catalyst for the reaction of the amine-terminated compound and the polyisocyanate is also used in making foam according to this invention. Although a wide variety of materials are known to be useful for this purpose, the most widely used and preferred catalysts are the tertiary amine catalysts and the organometallic catalysts.

Exemplary tertiary amine catalysts, include, for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropylamine, N,N-diethyl3-diethylaminopropylamine, dimethylbenzyl amine, bis(2-dimethylaminoethyl)ether, and the like. Tertiary amine catalysts are advantageously employed in an amount from about 0.01 to about 5, preferably about 0.05 to about 2 parts per 100 parts by weight of the amine-terminated compound.

Exemplary organometallic catalysts include organic salts of metals such as tin, bismuth, iron, mercury, zinc, lead and the like, with the organotin compounds being preferred. Suitable organotin catalysts include dimethyltindilaurate, dibutyltindilaurate, stannous octoate and the like. Other suitable catalysts are taught, for example, in U.S. Pat. No. 2,846,408. Advantageously, about 0.001 to about 0.5 part by weight of an organometallic catalyst is used per 100 parts of amine-terminated compound.

Polyurea or polyurea-polyurethane foam is prepared according to this invention by contacting the amine-terminated compound, blowing agent, polyisocyanate and catalyst together under conditions such that the components react to form a cellular polymer. Generally, the reaction mixture may contain additional components such as cross-linkers, catalysts, surfactants, colorants, cell openers, flame retardants, antioxidants, mold release agents and the like, which may vary according to the desired attributes of the foam, and whether the foam is a molded or slabstock foam.

Cross-linkers may be used, particularly in making molded foam or high resiliency slabstock foam, in order to improve load-bearing and processing. Suitable such cross-linkers include alkanolamines and other compounds of about 200 or lower equivalent weight having about 3–8, preferably about 3–4 active hydrogen-containing groups per molecule. Exemplary such compounds are glycerine and trimethylolpropane, as well as other alkylene triols. Preferred, however, are alkanolamines such as diethanolamine, triisopropanolamine, triethanolamine, diisopropanolamine, adducts of 4–8 moles of ethylene oxide and/or propylene oxide with ethylene diamine and the like, and polyamines such as methylene bis(o-chloroaniline), ethylenediamine, ammonia and the like. Most preferred, on the basis of its optimum reactivity, is diethanolamine. One advantage of the foam of this invention is that, at an equivalent level of cross-linker, the foam exhibits better load-bearing characteristics than similar foams made without the amine-terminated compound. Accordingly, to achieve equivalent load-bearing, it is possible with this invention to reduce or even eliminate the cross-linker compound. When used, however, less than 5 parts, preferably about 0.1 to about 4 parts of the cross-linker are advantageously employed per 100 parts of the amine-terminated compound. It is most preferred that the combined weight of cross-linker and chain extender, when used, is less than 5 parts per 100 parts by weight of the amine-terminated compound.

Chain extenders may also be used to further improve the load-bearing of the foam. "Chain extenders", for the purposes of this invention, include compounds having two active hydrogen-containing groups per molecule and an equivalent weight from about 31 to about 300, preferably about 31 to about 150. Hydroxyl-containing chain extenders include the alkylene glycols and glycol ethers such as ethylene glycol, 1,3-propylene glycol, 1,4-butylene glycol, 1,6-hexamethylene glycol, diethylene glycol, triethylene glycol, dipropylene glycol, tripropylene glycol, 1,4-cyclohexanedimethanol and the like. Amine chain extenders include diethyltoluene diamine, phenylene diamine, methylene bis(o-chloroaniline), NaCl blocked methylene bis(aniline), toluene diamine, aromatic diamines which are substituted at least one of the carbon atoms adjacent to the amine groups with a lower alkyl group, and the like. Such chain extenders, when used, are advantageously employed in a minor amount, i.e., less than about 5 parts by weight per 100 parts by weight amine-terminated compound. Most preferably, the combined weight of chain extender and cross-linker is less than 5 parts by weight per 100 parts by weight amine-terminated compound. It is usually preferable, however, to prepare the foam in the absence of a chain extender.

In order to make a stable foam, i.e., one which does not collapse or contain significant quantities of large pores, a surfactant which stabilizes the foaming reaction mixture against collapse until the mixture is sufficiently cured to maintain its configuration may be used. Suitable surfactants include siloxane/poly(alkylene oxide) copolymers as described, for example, in U.S. Pat. Nos. 3,887,500 and 3,957,842. The selection and use of such surfactants in preparing foams is well-known in the art. However, one advantage of this invention is that reduced levels of surfactant can be used, and sometimes the surfactant can be eliminated altogether. Accordingly, it is preferred to use a surfactant in an amount less than about 0.5, preferably less than about 0.25 part per 100 parts of amine-terminated compound. In an especially preferred embodiment, the foam is prepared in the substantial absence of a surfactant.

According to this invention, foam is prepared in a one-shot process by mixing all reactive components, catalysts, and optional ingredients and permitting same to react. The benefits of this invention are particularly seen in the preparation of molded foam. In preparing molded polyurea-polyurethane foam, all components except the polyisocyanate are advantageously blended together and injected as a single stream into a mixing head. However, certain components such as catalysts or halogenated methane blowing agents are sometimes blended with the polyisocyanate. In addition, the water and surfactant, when used, can be introduced as a separate stream, if desired. The polyisocyanate is added to the mixing head as a separate stream where it is mixed with the polyol mixture and injected into the mold. In performing the mixing and mold filling steps, conventional, low pressure apparatus can be used, or high pressure impingement mixing processes, such as a reaction injection molding process, can be used. Generally, the components are mixed at approximately room temperature, although components such as pure MDI which are solid at room temperature may be heated above their melting points.

In one molding technique (hot molding process), the reactants are placed into a mold which is at ambient temperature. After filling, the mold is placed into an oven at a temperature of about 150° C. to about 275° C. to effect curing. In a second technique (cold molding process), the reactants are placed into a mold which is preheated to about 30° C. to about 75° C. After the mold is filled, it is placed in a 70° C.–150° C. oven to effect cure. In a third technique, the filled mold is maintained at ambient temperature during the curing process. In this third technique, the mold may or may not be preheated.

Sufficient of the reaction mixture is placed into the mold so that, after expansion, the mixture completely fills the mold. Advantageously, a small excess of material is added over that minimally required to fill the mold. After filling the mold, the reaction mixture is permitted to cure in the mold at least to a state which permits the molded foam to be removed from the mold without permanent undesired distortion. In typical commercial procedures, an in-mold cure time of about 2 to about 30 minutes is adequate for this purpose. If required, the foam can be postcured by heating to about 50° C. to about 120° C. for a period of about 10 minutes to about 24 hours, preferably about 20 minutes to about 2 hours.

It may be necessary or desirable to mechanically open the cells of the foam during or after cure. This can be done by crushing the foam, puncturing the foam, vacuum crushing the foam, or by releasing the pressure in the mold at a proper stage of cure as taught in U.S. Pat. No. 4,579,700, incorporated herein by reference. An advantage of this invention is that the postcure shrinkage associated with inadequate cell opening is usually substantially reduced, thereby reducing or eliminating the need to mechanically open the cells.

In making the less preferred slabstock foam, the reaction mixture also advantageously contains a surfactant and catalyst as described before. Cross-linkers, although they may be used, are often omitted from slabstock formulations. In the commercial production of slabstock foam, the components can be and typically are introduced individually to a mixing head where they are thoroughly blended and metered onto a bed where foaming takes place. However, preblending of the components, except for the polyisocyanate, can be done if desired. The components are advantageously at room temperature or a slightly elevated temperature when blended in the mixing head, although preheating may be necessary in some instances to melt components which are solid at room temperature.

The foam of this invention is useful, for example, as bedding, furniture cushioning, padding, carpet underlayment, attached cushion carpet backing, automobile head rests, crash pads, door handles, head liners, seating and the like. This invention is particularly useful in applications wherein good load-bearing characteristics are desired, or where a low density, high water formulation is desired.

The following examples are provided to illustrate the invention but are not intended to limit the scope thereof.

All parts and percentages are by weight unless otherwise indicated.

EXAMPLE 1

In this example, a difunctional primary aromatic amine-terminated polyether is reacted with polymeric MDI to form molded foam.

Flexible foam Sample Nos. 1 and 2, and Comparative Samples A and B are prepared from the formulations indicated in Table I.

TABLE I

| | Parts by Weight | | | |
|---|---|---|---|---|
| Component | Sample No. 1 | Comp. Sample A* | Sample No. 2 | Comp Sample B* |
| Amine-terminated Polyether A[1] | 100 | 0 | 100 | 0 |
| Polyol A[1] | 0 | 100 | 0 | 100 |
| diethanolamine | 0 | 0.5 | 0 | 0.5 |
| Water | 4.5 | 4.5 | 4.5 | 4.5 |
| Amine Catalyst[2] | 1 | 1 | 1 | 1 |
| Silicone Surfactant A[3] | 0 | 0.75 | 0 | 0.75 |
| Silicone Surfactant B[4] | 0.75 | 0 | 0.75 | 0 |
| Silicone Surfactant C[5] | 0 | 0.3 | 0 | 0.3 |
| Silicone Surfactant D[6] | 0.3 | 0 | 0.3 | 0 |
| Polymeric MDI A[7] | 80.3 | 80.3 | 0 | 0 |
| Polymeric MDI B[8] | 0 | 0 | 80.3 | 80.3 |

*Not an example of this invention.
[1]Polyol A is a difunctional, 1000 equivalent weight poly(propylene oxide) which contains 18% by weight of a terminal poly(ethylene oxide) block. Amine-terminated Polyether A is prepared by reacting Polyol A with p-nitrochlorobenzene and subsequently reducing the nitro groups to primary amine groups. About 83% of the hydroxyl groups are converted to primary aromatic amine groups.
[2]A proprietary tertiary amine catalyst sold by Union Carbide Corporation as C225 catalyst.
[3]Y-10148 surfactant, sold by Union Carbide Corp.
[4]DC-5043 surfactant, sold by Dow Corning Corp.
[5]L-540 surfactant, sold by Union Carbide Corp.
[6]DC-10140 surfactant, sold by Dow Corning Corp.
[7]A 135 equivalent weight polymeric MDI (2.2-2.4 functional) prepared from 12 weight percent of the 2,4'-isomer.
[8]A 135 equivalent weight polymer MDI (2.2-2.4 functional) prepared from 2.5 weight percent of the 2,4'-isomer.

Molded foam is made from each of Sample Nos. 1 and 2 and Comparative Samples A and B by mixing the components, transferring same to an 8"×8"×3" mold which is preheated to 145° F., and after the foam has risen, placing the mold in a 175° F. oven for 3 minutes, at which time the foam is demolded. The foams have properties as indicated in Table II following.

TABLE II

| | Sample or Comparative Sample No. | | | |
|---|---|---|---|---|
| Property | 1 | A* | 2 | B* |
| Density, $lb/ft^3$ | 2.02 | 1.91 | 2.13 | 2.11 |
| Tensile Str., psi[1] | 22.7 | 12.9 | 35.1 | 14.0 |
| Elongation, %[1] | 70 | 50 | 82 | 74 |
| Tear Str.[2], lb/ft | 2.14 | 1.25 | 2.19 | 1.22 |
| Resiliency, %[3] | 28 | 30 | 33 | 35 |
| Compression Set, %[4] | 81 | 56 | 72 | 55 |
| IFD[5] | | | | |
| 25% | 46 | 65 | 54 | 68 |
| 65% | 140 | 137 | 158 | 159 |
| ret. to 25% | 22 | 35 | 28 | 37 |
| % Hysteresis Return[5] | 47 | 54 | 52 | 54 |
| Modulus[6] | 3.04 | 2.11 | 2.93 | 2.34 |
| Air Flow, cfm[7] | 0.41 | 0.18 | 0.14 | 0.43 |

*Not an example of this invention.
[1]ASTM D-3574-81 Test E.
[2]ASTM D-3574-81 Test F.
[3]ASTM D-3574-81 Test H.
[4]ASTM D-3574-81 Test D.
[5]ASTM D-3574-81 Test B. IFD is indentation force deflection.
[6]Modulus = 65% IFD/25% IFD.
[7]ASTM D-3574-81.

As can be seen from the data in Table II, major improvements in modulus, tensile strength, and tear strength are obtained with this invention. The modulus values are particularly significant, since moduli such as obtained with this invention indicate that the foam will provide particularly comfortable seating. These values are particularly surprising because Sample Nos. 1 and 2 were made without a cross-linker.

EXAMPLE 2

Flexible foam Sample Nos. 3-7 are prepared from formulations as described in Table III following.

TABLE III

| | Parts by Weight | | | | |
|---|---|---|---|---|---|
| Component | Samp. No. 3 | Samp. No. 4 | Samp. No. 5 | Samp. No. 6 | Samp. No. 7 |
| Amine-terminated Polyether B[1] | 100 | 50 | 40 | 60 | 100 |
| Polyol B[1] | 0 | 0 | 60 | 40 | 0 |
| Polyol C[2] | 0 | 50 | 0 | 0 | 0 |
| diethanolamine | 1.7 | 1.7 | 1.7 | 1.7 | 1.7 |
| Water | 3.8 | 3.8 | 3.8 | 3.8 | 7.5 |
| triethylene diamine solution[3] | 0.25 | 0.25 | 0.25 | 0.25 | 0.25 |
| bis(2-dimethyl aminoethyl)ether[4] | 0.05 | 0.05 | 0.05 | 0.05 | 0.05 |
| Silicone Surfactant B[5] | 1.6 | 1.6 | 1.6 | 1.6 | 1.6 |
| Cell Opener[6] | 0.04 | 0 | 0 | 0 | 0 |
| 80/20 TDI[7] | 48.4 | 48.4 | 48.4 | 48.4 | 51.2 |

[1]Polyol B is a 1650 equivalent weight, nominally trifunctional poly(propylene oxide) containing about 18 weight percent ethylene oxide end-capping. Amine-Terminated Polyether B is prepared by reacting Polyol B with p-nitrochlorobenzene and reducing the nitro groups to primary amine groups.
[2]A 25% solids SAN copolymer polyol, using Polyol B as the base polyol.
[3]A 33 wt. % solution in dipropylene glycol.
[4]As a 10% solution in Amine-terminated Polyether B.
[5]DC-5043, sold by Dow Corning Corporation.
[6]A silicone oil sold by Dow Corning Corporation as DCF 11630.
[7]A mixture of 80 weight percent of the 2,4-isomer and 20 weight percent of the 2,6-isomer.

Foam Sample Nos. 3-7 are prepared according to the general procedure described in Example 1, with results as indicated in Table IV following.

TABLE IV

| | Sample Number | | | | |
|---|---|---|---|---|---|
| Property | 3 | 4 | 5 | 6 | 7 |
| Density, $lb/ft^3$ | 1.98 | 1.92 | 1.95 | 1.84 | 1.19 |
| Tensile Str., psi[1] | 15.0 | 20.9 | 15.8 | 15.6 | 19.1 |
| Elongation, %[1] | 109 | 104 | 125 | 121 | 91 |
| Tear Str., $lb/in^2$ | 1.18 | 1.40 | 1.17 | 1.23 | 1.76 |
| Resiliency, %[3] | 50 | 49 | 60 | 55 | 46 |
| Compression Set, %[4] | 41.0 | 23.1 | 16.7 | 14.8 | 66.5 |
| IFD[5] | | | | | |
| 25% | 28 | 31 | 19 | 19 | 26 |
| 65% | 66 | 78 | 47 | 46 | 55 |
| ret. to 25% | 21 | 23 | 16 | 15 | 15 |
| % Hysteresis Return[5] | 73 | 75 | 83 | 80 | 59 |
| Modulus[6] | 2.36 | 2.52 | 2.47 | 2.42 | 2.12 |
| Air Flow, cf/min[7] | 2.0 | 1.2 | 3.1 | 2.8 | 1.1 |

[1]ASTM D-3574-81 Test E.
[2]ASTM D-3574-81 Test F.
[3]ASTM D-3574-81 Test H.
[4]ASTM D-3574-81 Test D.
[5]ASTM D-3574-81 Test B. IFD is indentation force deflection.
[6]Modulus = 65% IFD/25% IFD.
[7]ASTM D-3574-81.

All foams have good physical properties. Of particular interest is Sample No. 7, in which about 7.5 parts of water are used per 100 parts amine-terminated compound. A very low density foam having particularly good physical properties, especially tensile and load-bearing properties, is obtained.

EXAMPLE 3

In this example, a nominally trifunctional secondary aliphatic amine-terminated polyether is reacted with an isomeric mixture of TDI to form a molded foam.

Flexible foam Sample Nos. 8–10 are prepared from the formulations indicated in Table V.

TABLE V

| Component | Parts by Weight Samp. No. 8 | Samp. No. 9 | Samp. No. 10 |
|---|---|---|---|
| Amine-terminated Polyether C[1] | 100 | 100 | 100 |
| Diethanolamine | 1.5 | 1.7 | 1.7 |
| Water | 3.8 | 3.8 | 3.8 |
| triethylene diamine solution[2] | 0.25 | 0.12 | 0.12 |
| bis(2-dimethyl aminoethyl)ether[3] | 0.05 | 0.075 | 0.075 |
| Silicone Surfactant B[4] | 2.0 | 1.65 | 1.65 |
| dibutyltindilaurate | 0.0042 | 0.0042 | 0.0042 |
| N—[3-(dimethylamino)propyl]-N,N',N'—trimethyl-1,3-propanediamine[5] | 0.15 | 0.24 | 0.24 |
| 80/20 Toluene diisocyanate[6] | 101 index | 101 index | 105 index |

[1]Prepared by reacting a primary amine-terminated, 5000 molecular weight, nominally trifunctional polyether with acrylonitrile until essentially all primary amine groups are converted to secondary amine groups.
[2]A 33% solution in dipropylene glycol (DPG).
[3]As a 10% solution in Amine-terminated Polyether C.
[4]DC-5043 surfactant, sold by Dow Corning Corporation.
[5]Sold by Abbott Laboratories as Polycat 77.
[6]See footnote[7] of Table III.

Foams are made from each of these formulations by mixing all components except the TDI, and with all components at about 78° F., blending in the TDI and pouring the mixture into a 15"×15"×4.5" mold which is preheated to 140° F. After filling the mold, it is closed and immediately placed into a 250° F. oven for four minutes, after which the resulting foam is demolded. After cooling, the physical properties of the foam are determined to be as indicated in Table VI.

TABLE VI

| Property | Sample No. 8 | 9 | 10 |
|---|---|---|---|
| Density, lb/ft[3] | 2.02 | 2.17 | 2.20 |
| Tensile Str., psi[1] | 20.5 | 19.0 | 18.6 |
| Elongation; %[1] | 184 | 168 | 147 |
| Tear Str., lb/in[2] | 1.75 | 1.55 | 1.42 |
| Resiliency, %[3] | 48 | 43 | 51 |
| Compression Set, %[4] | 15.5 | 19.7 | 21.3 |
| IFD[5] | | | |
| 25% | 22 | 18 | 20 |
| 65% | 65 | 56 | 65 |
| ret. to 25% | 17 | 15 | 16 |
| % Hysteresis Return[5] | 79 | 80 | 79 |
| Modulus[6] | 2.95 | 3.11 | 3.25 |
| Air Flow, cf/min[7] | 1.75 | 1.9 | 1.75 |
| Air Flow, crushed, cf/min[7] | 4.0 | 3.4 | 3.7 |

[1-7]See notes [1-7] of Table IV.

All foams have good properties. Of particular interest are the IFD and modulus values. A foam similarly made, except using a hydroxyl-terminated polyether instead of the amine-terminated polyether, normally has a 25 percent IFD of about 16 and a 65 percent IFD of about 44. The IFD values provided by the foam of this invention are substantially higher. Likewise, a foam made using a mixture of a SAN copolymer polyol at an effective solids level of about 12.5 percent by weight, based on the weight of the polyol, demonstrates typical 25 percent IFD values of 17–21 and 65 percent IFD values of 52–59. The use of amine-terminated polyethers is seen to provide load-bearing properties equal or superior to foam made with microscopic reinforcement. In addition, the modulus values of this foam are very high, as is desired and difficult to achieve with the use of copolymer polyol.

EXAMPLE 4

Using the formulation set out in Table VII below, a molded polyurethane foam (Sample No. 11) is made using the general procedure described in Example 1.

TABLE VII

| Component | Parts by Weight |
|---|---|
| Amine-terminated Polyether B[1] | 75 |
| Copolymer Polyol A[2] | 25 |
| Diethanolamine | 1.7 |
| Water | 3.8 |
| triethylene diamine solution[3] | 0.12 |
| bis(2-dimethylaminoethyl)ether[4] | 0.075 |
| dibutyltindilaurate | 0.0042 |
| N—[3-(dimethylamino)propyl]-N,N',N'—trimethyl-1,3-propanediamine[5] | 0.24 |
| Cell Opener[6] | 0.05 |
| 80/20 Toluene diisocyanate[7] | 105 index |

[1]Prepared by reacting a primary amine-terminated, 5000 molecular weight, nominally tri-functional polyether with p-nitrochlorobenzene, followed by reduction of the nitro group to the primary amine.
[2]A 40% solids SAN-type copolymer polyol having Polyol B as the base polyol.
[3]A 33% solution in dipropylene glycol (DPG).
[4]As a 10% solution in Amine-terminated Polyether C.
[5]Sold by Abbott Laboratories as Polycat 77.
[6]A silicone oil sold by Dow Corning Corporation as DCF 11630.
[7]See note [7] of Table III.

The resulting foam has properties as set out in Table VIII.

TABLE VIII

| Property | Value |
|---|---|
| Density, lb/ft[3] | 2.20 |
| Tensile Str., psi[1] | 18.0 |
| Elongation, %[1] | 83 |
| Tear Str., lb/in[2] | 1.37 |
| Resiliency, %[3] | 36.6 |
| Compression Set, %[4] | 80 |
| IFD[5] | |
| 25% | 61 |
| 65% | 148 |
| % Hysteresis Return[5] | 66 |
| Modulus[6] | 2.43 |
| Air Flow, cf/min[7] | 6.0 |

[1]ASTM D-3574-81 Test E.
[2]ASTM D-3574-81 Test F.
[3]ASTM D-3574-81 Test H.
[4]ASTM D-3574-81 Test D.
[5]ASTM D-3574-81 Test B. IFD is indentation force deflection.
[6]Modulus = 65% IFD/25% IFD.
[7]ASTM D-3574-81.

The combination of amine-terminated compound and copolymer polyol here provides dramatic improvement in load bearing, as indicated by the IFD values reported in Table VIII. A similar, but less pronounced effect is also seen in Sample No. 4, which also employs a blend of amine-terminated compound and copolymer polyol.

What is claimed is:

1. An open-celled flexible polyurea or polyurea-polyurethane foam having a density of 6 pounds per cubic foot or less, which is the reaction product of a reaction mixture comprising (A) a relatively high equivalent weight compound or mixture thereof having an average of about 1.5 to about 4 active hydrogen-containing groups per molecule, of which active hydrogen-containing groups, at least about 30 percent are primary aromatic, Lewis acid-blocked primary aliphatic, secondary aliphatic or aromatic amine groups or a mixture of such groups, (B) a blowing agent, in amount sufficient to provide a cellular structure to the foam, (C) less than about 5 parts by weight of a cross-linker or chain extender per 100 parts of component (A), and (D) a polyisocyanate.

2. The foam of claim 1 wherein the reaction mixture further comprises an effective amount of a catalyst.

3. The foam of claim 2 wherein the polyisocyanate is present in an amount sufficient to provide an isocyanate index of about 90 to about 125.

4. The foam of claim 3 wherein the blowing agent comprises water, which is present in an amount of at least 3.5 parts by weight per 100 parts of Component (A).

5. The foam of claim 4 wherein Component (A) has an equivalent weight from about 500 to about 2500.

6. The foam of claim 5 which is a molded foam.

7. The foam of claim 6 which is prepared in the substantial absence of a surfactant.

8. The foam of claim 5 wherein the polyisocyanate comprises an isomeric mixture of 2,4- and 2,6-toluene diisocyanate.

9. The foam of claim 5 wherein the polyisocyanate comprises an isomeric mixture of 2,4'- and 4,4'-diphenylmethanediisocyanate or derivative thereof and component (A) has an average functionality of about 1.9 to about 2.05.

10. The foam of claim 6 wherein the reaction mixture contains about 5 to about 10 parts water.

11. The foam of claim 1 wherein Component (A) comprises an aromatic amine-terminated polyether.

12. The foam of claim 6 wherein Component (A) comprises an aromatic amine-terminated polyether.

13. The foam of claim 11 wherein the aromatic amine-terminated polyether comprises a reaction product of a polyether polyol and a halogenated nitrobenzene compound in which the nitro groups are subsequently reduced to primary amine groups.

14. The foam of claim 12 wherein the aromatic amine-terminated polyether comprises a reaction product of a polyether polyol and a halogenated nitrobenzene compound in which the nitro groups are subsequently reduced to primary amine groups.

15. The foam of claim 1 wherein Component (A) comprises a secondary aliphatic amine-terminated polyether.

16. The foam of claim 6 wherein Component (A) comprises a secondary aliphatic amine-terminated polyether.

17. The foam of claim 15 wherein the secondary aliphatic amine-terminated polyether comprises a Michael addition product of a primary amine-terminated polyether and an ethylenically unsaturated compound.

18. The foam of claim 16 wherein the secondary aliphatic amine-terminated polyether comprises a Michael addition product of a primary amine-terminated polyether and an ethylenically unsaturated compound.

19. The foam of claim 17 wherein the secondary aliphatic amine-terminated polyether is prepared in a reductive amination of a polyether polyol with a primary amine.

20. The foam of claim 18 wherein the secondary aliphatic amine-terminated polyether is prepared in a reductive amination of a polyether polyol with a primary amine.

21. The foam of claim 20 wherein the primary amine is isopropylamine.

22. The foam of claim 21 wherein the primary amine is isopropylamine.

23. A process for preparing an open-celled polyurethane foam, comprising reacting a reaction mixture in a one-step process under conditions such that a flexible polyurea or polyurea-polyurethane foam is obtained, wherein the reaction mixture comprises (A) a relatively high equivalent weight compound or mixture thereof having an average of about 1.5 to about 4 active hydrogen-containing groups per molecule, of which active hydrogen-containing groups, at least about 30 percent are primary aromatic, Lewis acid-blocked primary aliphatic, secondary aromatic or aliphatic amine groups or a mixture of such groups, (B) a blowing agent, in amount sufficient to provide the foam with a density of less than 6 pounds per cubic foot, (C) less than about 5 parts by weight of a cross-linker or chain extender per 100 parts of component (A), and (D) a polyisocyanate.

24. The process of claim 23 wherein component (A) has an average equivalent weight from about 500 to about 2500, component (C) comprises an isomeric mixture of toluene diisocyanate, MDI or a derivative of MDI, and the reaction mixture further comprises effective amounts of a catalyst and a surfactant.

25. The process of claim 24 wherein the blowing agent comprises water.

26. The process of claim 25 wherein component (A) comprises an aromatic amine-terminated polyether.

27. The process of claim 25 wherein component (A) comprises a secondary aliphatic amine-terminated polyether.

28. An improvement in a process for preparing an open-celled flexible polymer foam by reacting components comprising a relatively high equivalent weight compound having a plurality of active hydrogen-containing groups, less than 5 parts by weight of a cross-linker or chain extender per 100 parts of the relatively high equivalent weight compound and a polyisocyanate in the presence of a sufficient amount of a blowing agent to provide the foam with a density of 6 pounds per cubic foot or less, the improvement comprising using as the relatively high equivalent weight compound a relatively high equivalent weight compound having from about 1.5 to about 4 active hydrogen-containing groups per molecule, of which groups at least about 30 percent are primary aromatic, Lewis-acid-blocked primary aliphatic or secondary aliphatic or aromatic amine groups.

29. The process of claim 28 wherein the blowing agent comprises water.

30. The process of claim 29 wherein component (A) comprises a secondary aliphatic amine-terminated polyether.

31. The process of claim 29 wherein component (A) comprises an aromatic amine-terminated polyether.

32. An open-celled polyurea or polyurea-polyurethane foam having a density of 6 pounds per cubic foot or less prepared by reacting a reaction mixture comprising (A) a polyether having an equivalent weight from about 500 to about 2500, an average functionality from about 1.8 to about 3, and having about 50 to about 100 percent of its active hydrogen-containing groups in the form of aromatic amine groups;

(B) about 3.5 to about 8 parts of water per 100 parts by weight of component (A);

(C) an effective amount of a tertiary amine catalyst;

(D) about 0.1 to about 4 parts, per 100 parts by weight of component (A) of an alkanolamine cross-linker; and (E) a sufficient amount of an aromatic polyisocyanate to provide an isocyanate index from about 95 to about 120.

33. An open-celled polyurea or polyurea-polyurethane foam having a density of 6 pounds per cubic foot or less prepared by reacting a reaction mixture comprising (A) a polyether having an equivalent weight from about 500 to about 2500, an average functionality from about 1.8 to about 3, and having about 50 to about 100 percent of its active hydrogen-containing groups in the form of secondary aliphatic amine groups;

(B) about 3.5 to about 8 parts of water per 100 parts by weight of component (A);

(C) an effective amount of a tertiary amine catalyst:

(D) about 0.1 to about 4 parts, per 100 parts by weight of component (A) of an alkanolamine cross-linker: and (E) a sufficient amount of an aromatic polyisocyanate to provide an isocyanate index from about 95 to about 120.

* * * * *